United States Patent
Yu et al.

[19]

[11] Patent Number: 5,832,482

[45] Date of Patent: Nov. 3, 1998

[54] METHOD FOR MINING CAUSALITY RULES WITH APPLICATIONS TO ELECTRONIC COMMERCE

[75] Inventors: Phillip Shi-lung Yu; Bob Chao-Chu Liang, both of Chappaqua, N.Y.; Ming-Syan Chen, Taipei, Taiwan

[73] Assignee: International Business Machines Corporation, Armonk, N.Y.

[21] Appl. No.: 804,128

[22] Filed: Feb. 20, 1997

[51] Int. Cl.⁶ .................................................. G06F 17/30
[52] U.S. Cl. ..................... 707/6; 707/1; 707/7; 707/512; 707/533; 707/3
[58] Field of Search ................. 707/1–10, 100–206, 707/500, 512, 515, 533; 705/10; 379/207; 600/523; 395/683; 364/468; 706/55

[56] References Cited

U.S. PATENT DOCUMENTS

| | | |
|---|---|---|
| 5,173,851 | 12/1992 | Off .............................................. 705/14 |
| 5,210,010 | 5/1993 | Deaton ...................................... 382/139 |
| 5,222,197 | 6/1993 | Teng ............................................ 395/68 |
| 5,418,887 | 5/1995 | Connah ........................................ 395/51 |
| 5,566,337 | 10/1996 | Szymanski ................................. 395/733 |
| 5,592,560 | 1/1997 | Deaton ...................................... 382/100 |
| 5,615,341 | 3/1997 | Agrawal ..................................... 705/10 |

*Primary Examiner*—Thomas G. Black
*Assistant Examiner*—Diane D. Mizrahi
*Attorney, Agent, or Firm*—Anne Vachon Doougherty; Marc S. Block

[57] ABSTRACT

For mining causality rules in an event database, the rules are obtained by iteratively generating candidate rules and counting their occurrences in the event database. Newly identified causality rules are used to generate the next set of candidate rules to be evaluated, by increasing the size of the set of consequential events triggered by triggering events and/or the number of triggering events. The preferred embodiment uses an iterative approach to deriving the causality rules in order of the consequential set sizes and triggering set sizes. The detection of an occurrence of a causality rule in an event sequence is handled as a sub-sequence matching problem using a novel hierarchical matching method to improve efficiency.

11 Claims, 4 Drawing Sheets

5,832,482

METHOD FOR MINING CAUSALITY RULES WITH APPLICATIONS TO ELECTRONIC COMMERCE

FIELD OF THE INVENTION

This invention relates to mining of causality rules from an event database, where each event may belong to multiple categories and the causality rule consists of a sequence of triggering events and a set of consequential events occurring in random order after the triggering events. The data mining can be applied to improve electronic commerce applications; for example, by identifying consumer telephone calling patterns and consumer buying patterns, with the mined information being applied to more effective on-line presentation of advertising and offerings to the consumers.

BACKGROUND OF THE INVENTION

Data mining has been developed to derive meaningful information from the large volumes of customer data which is currently gathered in the monitoring of telephone calling, credit card transactions, random surveys, etc. Deriving demographic trends from the volumes of material can assist marketers in focussing their advertising and promotions toward that segment of the population which is most likely to buy their product. In the arena of electronic commerce, the effective presentation of on-line advertising and offerings is integral for reaching the target audience. General broadcasting of advertising is wasteful, and frequently counterproductive. Therefore, it is desirable to tailor on-line advertising not only in content but also in distribution.

One emerging area of importance is the development of electronic directories, such as the Yellow Pages. The directory providers, primarily telecommunications companies, have been exploring alternatives to publishing their directories solely in book form. Alternative media include CD-ROM, audiotex with fax, on-line services, and interactive television. In addition to providing the directory pages (with the extensive advertising generally found therein) along the alternative media, the companies can serve as providers of transaction services in those media, which services would be facilitated by bundling of related advertising on their pages. A challenge is to design electronic presentations of relevant items based upon the users' past transaction patterns to maximize advertising efficiencies and sales.

Transaction patterns can be derived from collected data by observing customer behavior in terms of cause and effect, or what will be referred to herein as triggering events and consequential events. Hereinafter, the term "causality rule (s)" will refer to a means for describing certain customer behavior where some triggering event leads to a set of consequential events. For example, the purchase of a new car may start with calls and visits to car dealers, followed by calling to make inquiries about car insurance, auto loans, and prices for various automobile accessories. The triggering event would be calling/visiting the car dealer, with the consequential events being the calls to make inquiries into loans, insurance and accessories. No specific order is assumed among the consequential events. In mining causality rules, certain constraints such as time may additionally be applied. For example, it may be reasonable to require that all consequential events occur within a certain period after the triggering event has transpired. One can view the time constraint as a moving window on deciding causality rules or as the setting of an upper bound on the time gap between two successive events in a causality rule.

With respect to tracking telephone calls, in all of the telecommunications companies, a customer database is maintained having records of all phone calls made by each customer. The information gathered includes the customer id, the telephone number called, the start time of the call and the duration of the call. It can be assumed that one attempting to gather demographic information from such a database is only interested in calls made to business establishments whose numbers, and advertising, would ordinarily appear in the directory pages. Each business phone number would ideally be mapped into a corresponding directory page business category. The mapping may be 1:1 or 1:n where n>1, since a business may logically be listed under multiple categories in the directory pages. One would then like to map the list of business phone calls from each customer into a sequence of business events and/or sets of events indicated by the corresponding directory page categories of the events.

Another example would be that of consumer buying patterns. From a credit card transaction database, one would like to obtain the sequence of items bought by each customer, including the date and time of each purchase, the customer id, the item purchased, the price of the item, and possibly the identity of other items purchased at the same time. It would be desirable to then map the items into product categories applying mining rules such as discussed above.

The type of problem can be understood by reference to the following model. Given a sequence database of n sequences $(s_j, 1 \leq j \leq n)$. For any sequence $s_j = a_{j1}, a_{j2}, \ldots, a_{jk}$, each element $a_{ji}$ can either be a basic (i.e., single) event or a set of basic events. In the latter case, $a_{ji}$ is referred to as a composite event. A simple sequence consists of only basic events. A sequence $b_{j1}, b_{j2}, \ldots, b_{jh}$ is contained in another sequence $d_{j1}, d_{j2}, \ldots, d_{jk}$ if (1) for each $b_{ji}$ there exists either a simple event $d_{jm}$ matching it or a composite event $d_{ji}$ containing it and (2) for i<k the event matching/containing $b_{jk}$ in $d_{j1}, d_{j2}, \ldots, d_{jk}$ must follow the event matching/containing $b_{ji}$.

We regard "$c_1$ triggers $(r_1, \ldots, r_k)$" as a causality rule, if there is a sufficient number of sequences in the database containing $c_1$ followed by the $r_j$'s, $(1 \leq j \leq k)$ in any order and the $c_1, r_1, \ldots$, and $r_k$, satisfy some pre-specified constraints (like the aforementioned time constraint). This causality rule can be generalized to allow for a sequence of triggering events to lead to a set of consequential events. That is to say, "$(c_1, \ldots, c_m)$ triggering $(r_1, \ldots, r_k)$" may be regarded as a causality rule, if there is a sufficient number of sequences containing $(c_1, \ldots, c_m)$ followed by the $r_j$'s, $(1 \leq j \leq k)$ in any order, and furthermore that $c_1, \ldots c_m$, and $r_1, \ldots$, and $r_k$, satisfy some pre-specified constraints.

In an article entitled "Mining Association Rules between Sets of Items in Large Databases" by R. Agrawal, et al, Proc. ACM Conference on Management of Data (1993), the authors consider the problem of mining association rules. An example of an association rule might be that 98 percent of customers that purchase milk and bread also purchase eggs at the same time. Association rules deal with buying patterns within a transaction. All purchases in a transaction are treated as occurring at the same time. There is no concept of before or after (i.e., cause and effect or trigger and consequence).

Two other references which provide approaches to mining association rules include: "Fast Algorithms for Mining Association Rules" by R. Agrawal et al, Proc. Conference on Very Large Data Bases (1994), which attempts to apply improved algorithms to mining association rules; and "Set- Oriented Mining for Association Rules in Relational Databases" by M. Houtsma, et al, IEEE Conf. on Data Engineering (1995), which discusses the use of set-oriented query language (SQL) for mining association rules.

Association rules, as noted above, deal with intra-transaction information, the events in which have occurred effectively simultaneously, with no regard for cause and effect or trigger and consequence. Causality rules, on the other hand, deal with inter-transaction behavior. The triggering event must occur earlier in time than all of the consequential events. Furthermore, causality rules deal with events at the category level and allow each event to appear in multiple categories.

Mining of sequential events has been studied in "Mining Sequential Patterns" by R. Agrawal, et al, IEEE Conf. on Data Engineering (1995). Sequential events are inter-transaction events which are necessarily ordered in time, such that a second event always follows the first, and a third event follows the second, but the third would never directly follow the first. An example of a sequential pattern in a database of a video rental store would be that customers typically rent "The Godfather" first, then "Godfather II", and then "Godfather III".

Mining of generalized association rules has been studied in "Mining Generalized Association Rules" by R. Srikant and R. Agrawal, Proc. 21st VLDB Conference (1995). In that article, the authors provide a taxonomy (i.e., hierarchy) of items and derive association rules at a given level of the taxonomy. The categorization for causality rules does not form a taxonomy of the sort discussed in the article due to the fact that, in causality situations, each event may belong to multiple categories at the same level.

While the teachings of the above-noted articles are relevant to the mining of information in databases in general, none of the approaches is appropriate for mining non-sequential, inter-transaction information across multiple categories of information.

It is therefore an objective of the present invention to provide a solution for mining causality rules from an event database, where each event may belong to multiple categories.

It is another objective of the invention to provide a method and system for mining non-sequential consequential events which follow from triggering events.

SUMMARY OF THE INVENTION

For mining causality rules, the rules are obtained by iteratively generating candidate rules and counting their occurrences in the database. Newly identified causality rules are used to generate the next set of candidate rules to be evaluated. The preferred embodiment presented herein uses an iterative approach to deriving the causality rules in order of the consequential set sizes and triggering set sizes. The detection of an occurrence of a causality rule in an event sequence is handled as a sub-sequence matching problem using a hierarchical matching method to improve efficiency.

BRIEF DESCRIPTION OF THE DRAWINGS

The invention will now be described in greater detail with reference to the attached drawings wherein.

DESCRIPTION OF THE PREFERRED EMBODIMENT

Figure 1:
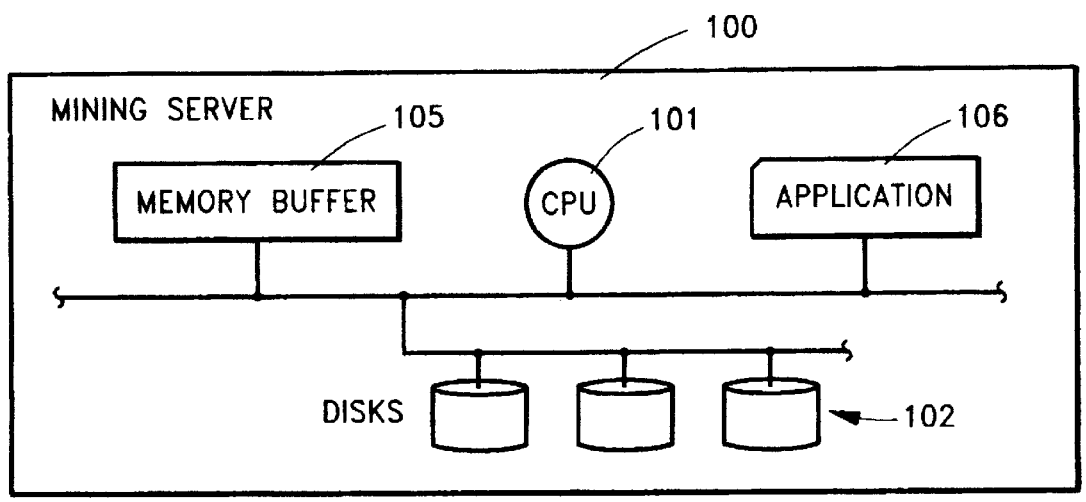
FIG. 1 is a block diagram of a data mining system.

The invention is implemented using a computer system of the type illustrated in FIG. 1. Data mining server 100 as illustrated includes processor 101, disks 102, temporary storage locations 105, and application 106. Clearly, other applications are available to processor 101; however, for the purpose of describing the present invention, only the data mining application 106 is illustrated and discussed. Processor 101 applies the causality rule mining application 106 to information retrieved from permanent storage locations 102, using memory buffers 105 to store the data in process. While the permanent storage is illustrated as disks resident within the server, clearly the information can be stored in alternative storage media, remote or local to the server, provided that the information can be read out of that media by processor 101. The data mining server can be embodied using any processor of sufficient performance capability to handle large amounts of data. For example, a small capacity data mining server could be embodied using a RISC System 6000*, while a larger capacity server could be embodied in an ES/9000* or SP 2* (* trademarks of International Business Machines Corporation, Armonk, N.Y.).

Figure 3:
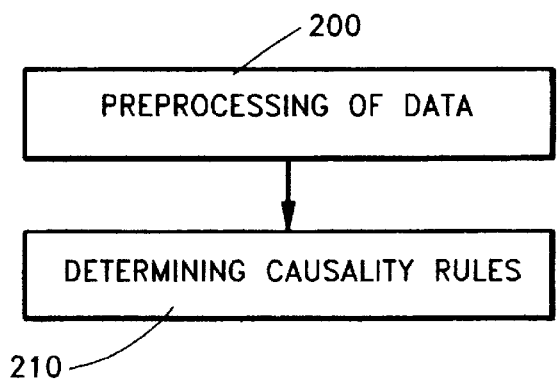
FIG. 3 is a generalized process flow diagram of the present inventive method.

Referring to FIG. 3, there is a generalized process flow of the data mining process according to an embodiment of the present invention. In step 200, the transaction database is pre-processed to create an event sequence database, as will be further detailed below, of N sequences, with the ith sequence consisting of $G_i$ events. The preprocessing can consist of a sorting phase, comprising sorting transaction records according to customer id and time, and a mapping phase, comprising mapping each transaction event into related categories. In step 210, the causality rules are derived and evaluated using hierarchical sub-sequence matching, iteratively generating candidate causality rules with increasing consequential set size for matching.

Given a customer database of transaction events, (e.g., a database of phone calls with customer id, phone call time, and calling number in each record), the records can be sorted by customer id and time. Thus an event sequence for each customer id can be obtained. Each event in that sequence can be further mapped into its associated category set (e.g., type of business represented by the calling number). Hereinafter, the existence of the event category sequence database is assumed, and the term "event" will apply to "event category." The problem of mining causality rules can be mapped from an event sequence database into a problem of counting large event sets. Initially, the case will be considered when there is only a single triggering event in each causality rule. The case will then be generalized to one in which a sequence of triggering events is allowed in each rule.

A sequence of k simple events, $c_1, r_1, \ldots, r_{k-1}$, is referred to as a large k-event rule, if there are sufficient numbers of sequences containing $c_1$ followed by the $r_j$'s where ($1 \leq j \leq k-1$) in any order (i.e., its fraction of appearances in the sequence database exceeds a minimum threshold). The set of all large k-event rules forms the large k-event set. A large k-event rule, $c_1, r_1, \ldots r_{k-1}$, represents a causality rule if the number of sequences containing $c_1, r_1, \ldots r_{k-1}$ exceeds some pre-specified fraction of the total number of sequences containing $c_1$. The foregoing is referred to as the confidence requirement of the causality rule.

Let $L_k$ represent the large k-event set. Here, without a loss of generality, it will be assumed that for each large k-event rule, $c_1, r_1, \ldots, r_{k-1}$, in $L_k$, the $r_1, \ldots, r_{k-2}, r_{k-1}$ are in lexicographic order. It is to be noted that $L_1$ denotes a degenerate case, where each element only represents a frequent event, not a causality rule. Only elements in $L_1$ can be triggering events or consequential events of a causality rule. First, $L_1$ is found by scanning the sequence database and keeping a database and keeping a count of the occurrences of each event. For each composite event which is a set of basic events, each of the basic events in the set receives an increment on its count.

Starting with k=2, we can then generate a candidate k-event set, $C_k$ from $L_{k-1}$. This can be done by joining $L_{k-1}$ with $L_{k-1}$ to derive $C_k$. Specifically, for k=2, $C_2$ is the cross-product of $L_1$ with itself. For k>2, any two large (k-1)-event rules in $L_{k-1}$, with the same starting event and matching k-3 of the remaining events, can be joined together to form a candidate k-event rule in $C_k$. The candidate k-event set will contain the large k-event set as its subset.

To count the occurrences in the event sequence database of each candidate k-event rule in $C_k$, it is necessary to scan through the sequence database to do a sub-sequence matching. Here the concept of hierarchical sub-sequence matching is introduced. Instead of comparing each candidate rule in $C_k$ directly with the event sequence in the database, the event sequence is transformed into a simple event sequence and the candidate rules in $C_k$ are compared to the simple event sequence. Only when a match occurs is the original sequence referred to, in order to verify that it is not a false match. The reason for the two step hierarchical matching is for improved efficiency as explained further below.

For a sequence $S_i$ in the database, we examine whether each $a_{ij}$ in the sequence can be a potential triggering event. First a maximum potential set of possible consequential events is determined, including all possible consequential events which can be triggered by $a_{ij}$ under the pre-specified constraints. The set of possible consequential events is designated as $R_{ij}$. (For example, if a time constraint from the triggering event is given, $R_{ij}$ will consist of all of the following events in $S_i$ occurring within the time constraint.) Each composite event in $R_{ij}$ is replaced by the basic events comprising it. After replacing the composite events, the basic events are then sorted in lexicographic order and the resulting sequence is denoted as $\Phi_{ij}$.

Next, the subset of $C_k$ rules that start with $a_{ij}$ and have their remaining portions matching some sub-sequences contained in $\Phi_{ij}$ is determined. This subset of $C_k$ is referred to as $\Delta_{ij}$. Set $R_{ij}$ must now be examined to assure that, after discarding its first event, the remaining portion of each candidate rule in $\Delta_{ij}$ is indeed a legitimate sub-sequence in $R_{ij}$. If so, the count of the corresponding candidate k-event rule in $C_k$ will be incremented. After the scan of the sequence database is completed, those candidate rules in $C_k$ with counts exceeding the threshold will become $L_k$. If $L_k$ is non-empty, the iteration continues with k incremented by 1.

In an example of the foregoing, assume that $S_i$=A,(B,W) ,D,(U,B),(H,G), . . . , and $R_{i1}$=(B,W),D,(U,B),(H,G). Then $\Phi_{i1}$={B,D,G,H,U,W}. Consider $C_3$={(A,B,H),(A,G,H),(A,E,W), . . . }. Both (A,B,H) and (A,G,H) start with A, with the remaining portions matching some sub-sequences of $\Phi_{i1}$; whereas (A,E,W) does not find a match. Thus $\Delta_{i1}$={(A,G,H),(A,B,H)}. By re-examining $R_{i1}$, only (A,B,H,) is found to be contained by one of the sub-sequences of $S_i$. It is to be noted that when examining candidate (A,G,H), both G and H come from the same composite event, such that (A,G,H) is not a sub-sequence of $S_i$.

The reason for performing the initial matching of $C_k$ with $\Phi_{ij}$ is that matching of two ordered lists is far more efficient than matching two non-ordered lists. The presence of composite events inhibits ordering of the lists, therefore it is desirable to break each composite event into its basic events. However, transforming each composite event into multiple single, or basic, events can create false matching, as with (A,G,H) in the above example. It is recommended, therefore, that an optional step of re-checking, to avoid false matching, be performed if a candidate rule in $\Delta_{ij}$ contains events from composite events.

Different approaches can be used to perform the checking. The preferred embodiment is to perform the checking using a bipartite graph matching algorithm as described by R. Sedgewick in *Algorithms,* 2nd. Edition, Addison-Wesley (Massachusetts, 1988). For each candidate rule matching $\Phi_{ij}$, a bipartite graph is built to map the rule back to the original sequence. In the bipartite graph, one set ($\Omega_1$) of vertices consists of events in the candidate rule which are mapped to events in $\Phi_{ij}$ derived from some composite events of the original sequence $S_i$. The other set ($\Omega_0$) of vertices consists of the composite events in the original sequence. An edge is introduced between a vertex in $\Omega_1$ and that in $\Omega_0$ if the vertex in $\Omega_1$ belongs to the composite event represented by the vertex in $\Omega_0$. The problem is to find the maximum matching for the bipartite graph. If all vertices in $\Omega_1$ can find a distinct match, the candidate rule is legitimate.

Figures 2A, 2B:
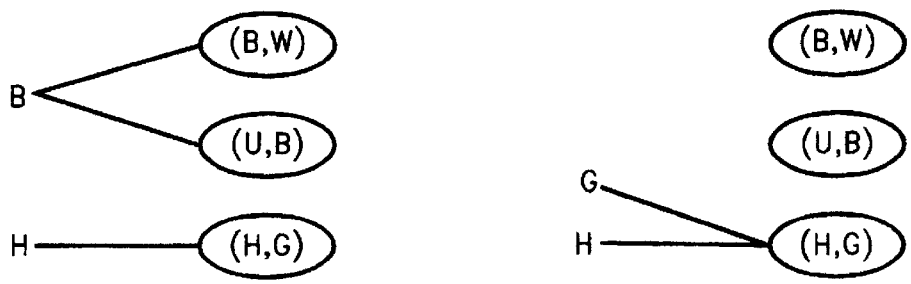
FIGS. 2A and 2B provides an illustration of bipartite graphing.

As relates to the above example, consider the case of (A,B,H). The resulting sets are $\Omega_1$=(B,H), and $\Omega_0$={(B,W) ,(U,B),(G,H)}. The corresponding bipartite graph is shown in FIG. 2(a). If is clear that distinct matches can be found for B and H, for example matching B with (B,W) and H with (G,H). An alternative way of matching is to match B with (U,B) and H with (G,H). For the case of (A,G,H), the resulting sets are $\Omega_1$={G,H}, and $\Omega_0$={(B,W),(U,B),(G,H)}. The corresponding bipartite graph is shown in FIG. 2(b). Clearly, a unique match for each event in $\Omega_1$ cannot be found, since G and H are basic events which are found as parts of the same composite event in the original set.

Finally, the general case is considered where a sequence of triggering events is allowed in each rule. The causality rule of "A and B triggering C" can hold true only if both rules "A triggers C" and "B triggers C" hold. The generalization to a sequence of triggering events is straightforward once all the causality events with a single triggering event have been obtained. Let $L_i^*$ be the large i-event set with k triggering events at the beginning of each sequence followed by i-k consequential events. Then $L_i^1$ equal to $L_i$. Starting with j=2 and i=j+1, then $L_i^j$ is obtained from $L_{i-1}^{j-1}$. Specifically, by joining any two rules in $L_{i-1}^{j-1}$ with (1) the same consequential set, and (2) the first j-2 triggering events in one of the sequences matching the last j-2 triggering events in the other sequence, a candidate set $C_i^j$ results, with j triggering events. For example, consider two sequences, $S_1$ and $S_2$ in $L_5^2$. Assuming that $S_1$=(A,E,F,H,Y) and $S_2$=(E,G,F,H,Y), the two rules can be joined to form a new candidate rule (A,E,G,F,H,Y) in $C_5$ where A, E and G are triggering events and F, H and Y form the consequential set of events. Applying the same procedure as before, the database occurrences of each i-event rule in $C_i^j$ are counted. When matching an i-event rule with a sequence in the database, the triggering sub-sequence should first be located. If successfully located, then matching of the consequential set is conducted using the hierarchical matching approach. The candidate i-event rules with occurrences exceeding the given threshold form $L_i^j$.

Figure 4A:
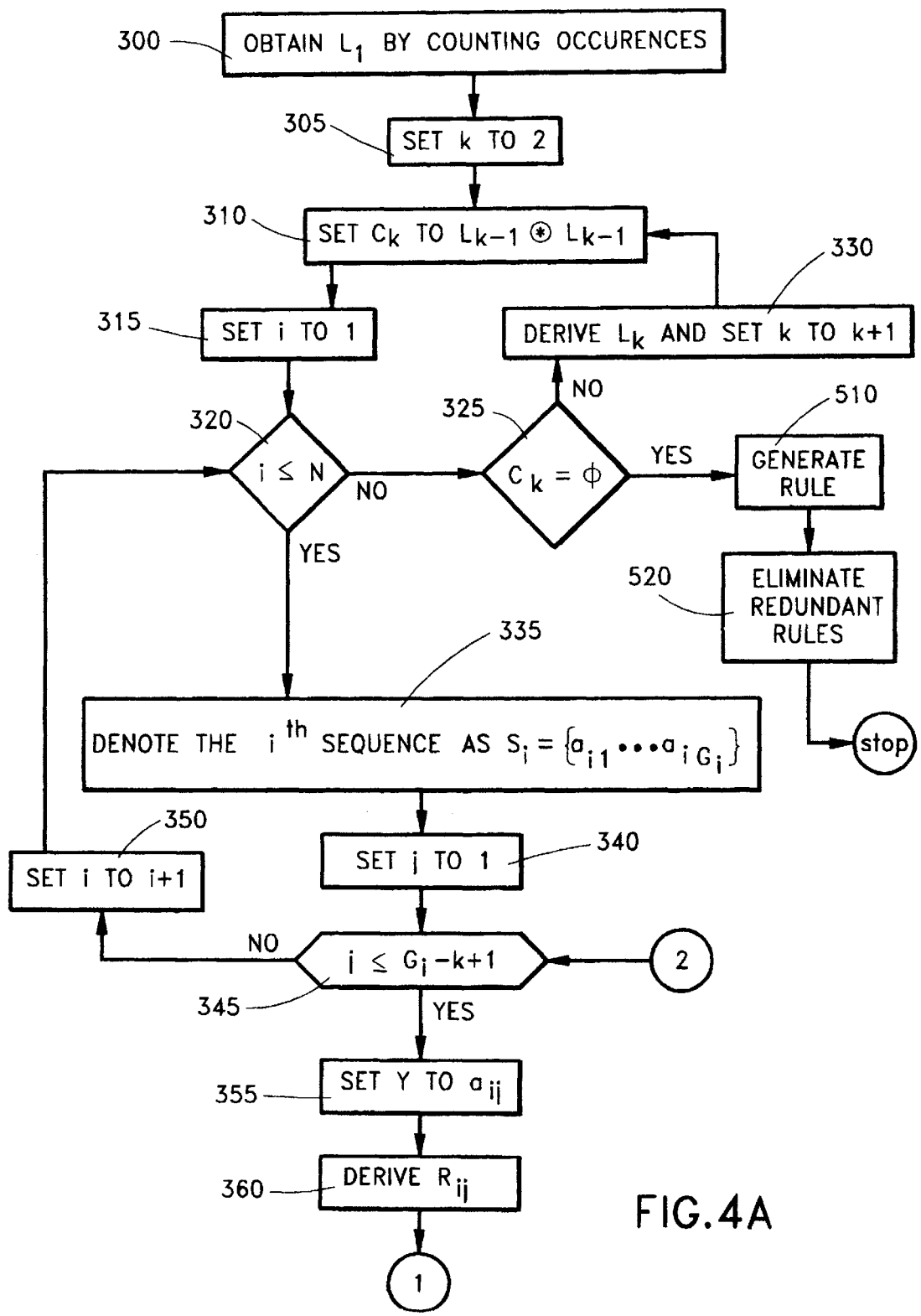
FIGS. 4(a) through 4(c) comprise a flow chart of the process for causality rule mining in accordance with a preferred embodiment of the invention.
Figure 4B:
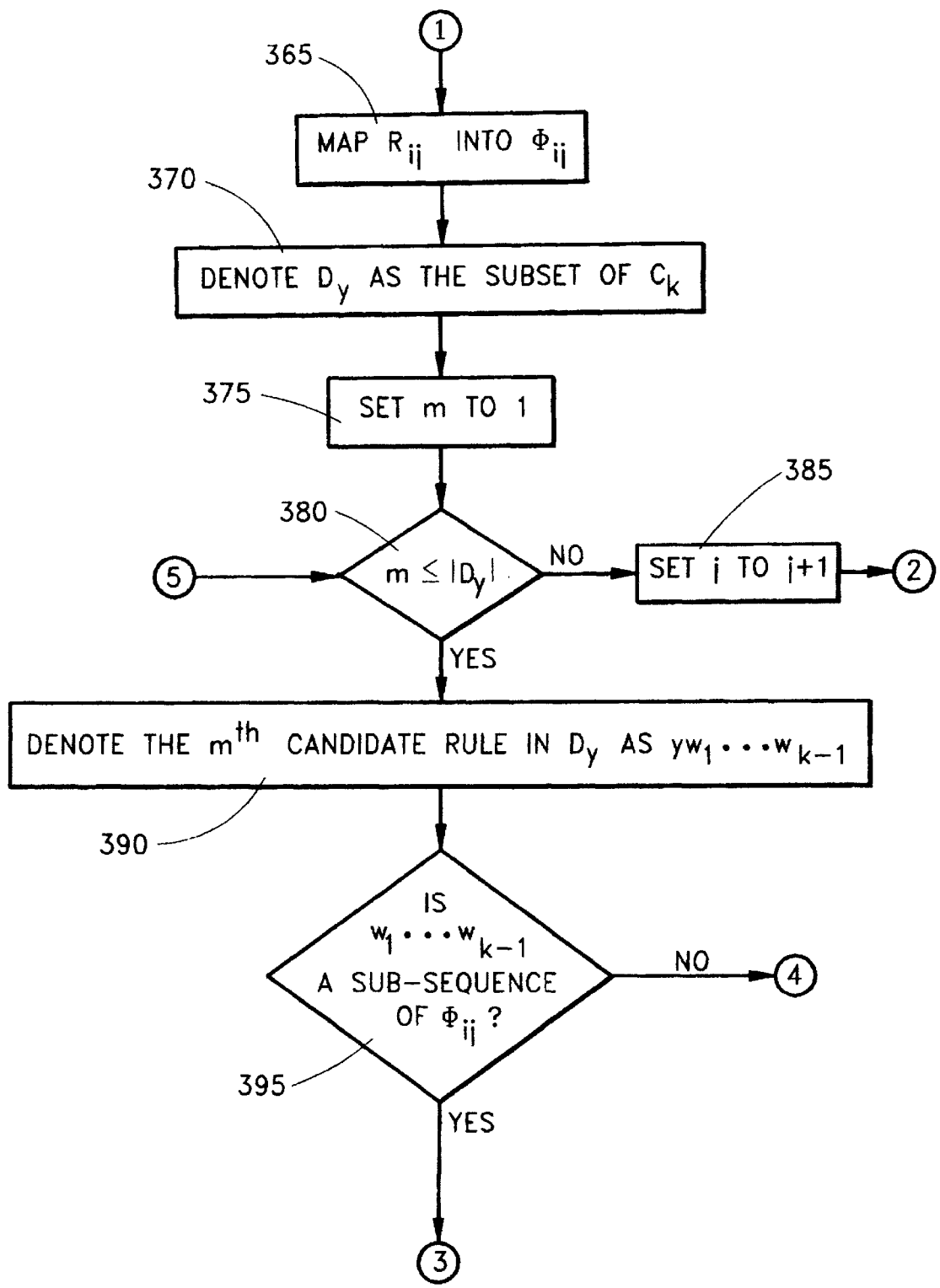
Figure 4C:
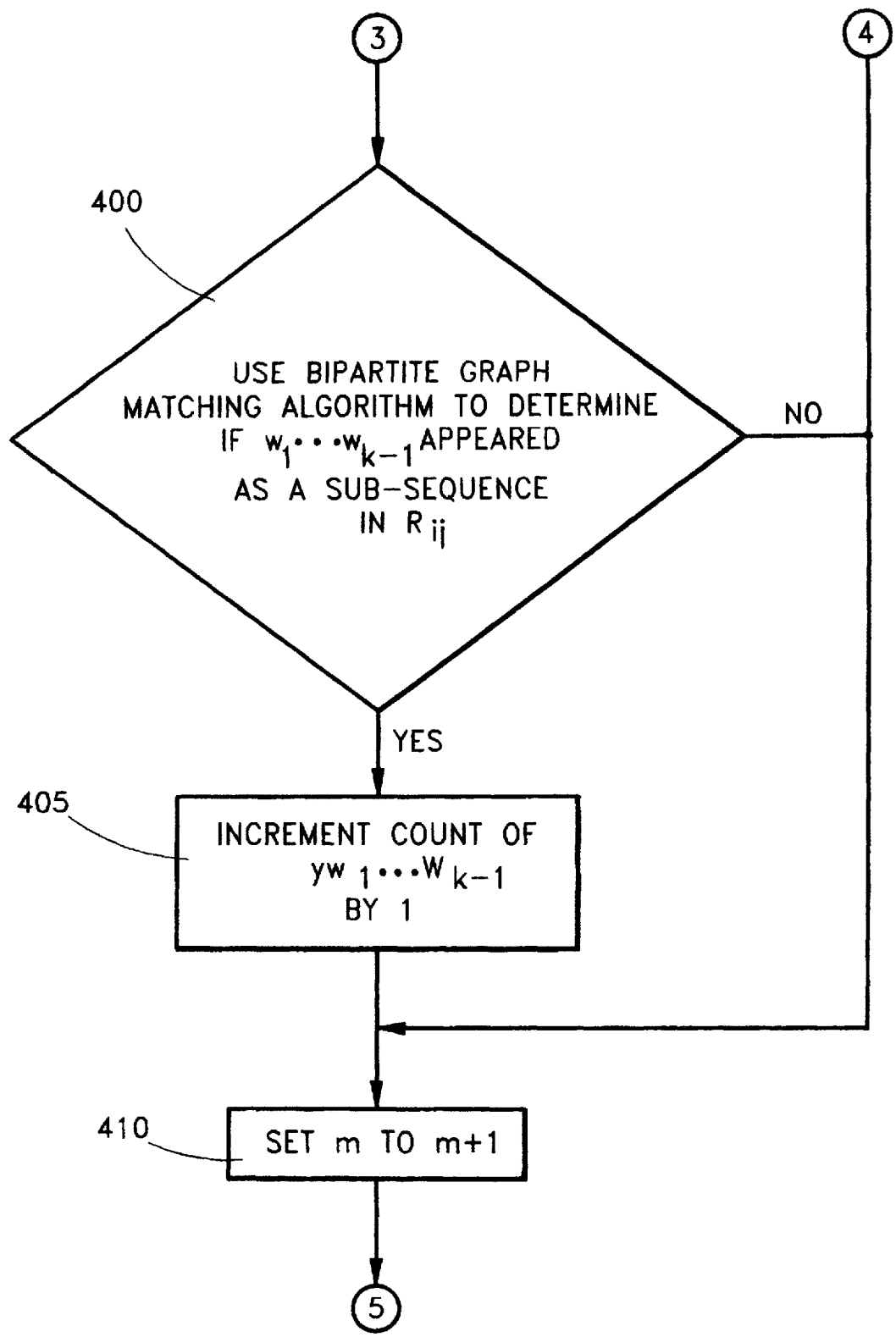

Referring now to FIGS. 4(a) through 4(c), a detailed process flow for data mining is given. In step 300, the number of occurrences of each event is counted across all user sequences. Those events with occurrence counts exceeding a given threshold requirement will be included in $L_1$, the large 1-event set. The next step is to determine $L_k$ for k>1. In step 305, k is set to 2. In step 310, the candidate large k-event set $C_k$, which is a super set of $L_k$ is derived. As mentioned before, this can be done by joining $L_{k-1}$ with $L_{k-1}$. Specifically, for k=2, $C_2$ is the cross-product of $L_1$ with itself. For k>2, any two rules in $L_{k-1}$ with the same starting event and matching k−3 of the remaining events can be joined together to form a candidate k-event rule.

The next step is scanning through the event sequence database to determine the number of occurrences of each candidate rule in $C_k$. In step 315, i is set to 1, where i is the index to scan through the event sequence database. In step 320, i is compared with N, the number of event sequences in the database. If smaller than N, there are more sequences to scan. In step 335, the ith sequence in the database is denoted as $S_i=\{a_{i1}, a_{i2}, \ldots, a_{iG_i}\}$. The next step is to scan through the sequence using an index j. In step 340, the index j is set to 1. At step 345, j is compared with $G_1$-k+1, where $G_1$ is the length of the i-th sequence and $G_1$-k+1 is the last event in the sequence that can start a sub-sequence of length k. If j is smaller than $G_1$-k+1, $a_{ij}$ may start a causality rule of length k.

In the next steps, candidate rules in $C_k$ are matched with a sub-sequence starting with $a_{ij}$. In step 355, y is set to equal $a_{ij}$. In step 360, $R_{ij}$ is derived, with $R_{ij}$ being the maximum potential set of consequential events that can be triggered by $a_{ij}$. Next, in step 365, which becomes necessary if any of the consequential events are composite events, $\Phi_{ij}$ is derived by (1) replacing each composite event in $R_{ij}$ by the basic events comprising it; and (2) re-ordering the basic events in lexicographic order. In step 370, $D_y$ is denoted as the subset of $C_k$ rules that start with $a_{ij}$.

Next, a scan is made through $D_y$ with an index of m to determine which candidate rules in $D_y$ have a match with $S_i$. In step 375, m is set to equal 1. In step 380, m is compared with the size of $D_y$. If m is larger, such that the scanning of $D_y$ is complete, j is incremented by 1 at step 385 and the system proceeds to step 345. If m is smaller, however, the m-th candidate rule in $D_y$ is designated as $yw_1w_2 \ldots w_{k-1}$, at step 390.

In step 395, a determination is made as to whether $w_1w_2 \ldots w_{k-1}$ a sub-sequence of $\Phi_{ij}$. If it is not a sub-sequence, the system proceeds to step 410. If it is sub-sequence, at step 400, a bipartite graph matching algorithm is applied to determine if $w_1w_2 \ldots w_{k-1}$ is a sub-sequence in $R_{ij}$, for the situation in which composite events are included in the set of consequential events. If the matching is not successful, the system proceeds to step 410. If it is determined that $w_1w_2 \ldots w_{k-1}$ is a sub-sequence in $R_{ij}$, the occurrence count of $yw_1w_2 \ldots w_{k-1}$ is incremented by 1. At step 410, m is incremented by 1 and the system proceeds to step 380.

A comparison is made to determine if $j<G_i$-k+1, at step 345. If the result of the comparison is "no," i is incremented by 1 at step 350 and the system returns to step 320. At step 320, the value for i is compared to N. If the comparison yields a "no" result, $C_k$ is checked to see if it is empty, at step 325. If not empty, $L_k$ is derived from $C_k$, where $L_k$ is set to include the candidate rules in $C_k$ with occurrence counts exceeding a pre-set threshold, at 330, and k is incremented by 1. If it is determined that $C_k$ is empty, then all of the large event rules have been determined.

In step 510, from the large event sets $L_2, \ldots, L_{k-1}$, causality rules are generated based on the confidence requirement. Finally, all redundant rules are eliminated at step 520; such that for any rule, if there exists another rule with the same triggering event and a larger consequential set containing its consequential set, (i.e., a more comprehensive rule exists) the less comprehensive rule will be eliminated.

The invention has been described with reference to its preferred embodiments. Many modifications within the scope of the presently disclosed invention will become apparent to one having skill in the art. As such, the scope of the invention shall not be limited by the preferred and exemplary embodiments, but only by the scope of the appended claims.

Having thus described our invention, what we claim as new and desire to secure by Letters Patent is:

1. A method for a computer to derive category information from a database of event data, wherein an event selected from said event data may belong to one or more of a plurality of categories, comprising the steps of:

preprocessing said event data into an event category database by ordering said event data into at least one event category sequence; and determining at least one causality rule from said preprocessed event data, wherein said determining of causality rules comprises the steps of:

(a) selecting at least one trigger event category from said preprocessed event database;

(b) determining a first consequential set comprising at least one event category from said preprocessed event database which may be caused by said at least one trigger event category;

(c) pairing said at least one trigger event category and said first consequential set into a first causality rule candidate;

(d) counting the number of occurrences of said first causality rule candidate in said preprocessed event database:

(e) generating a successive causality rule candidate comprising said at least one trigger event category and a successive consequential set by adding at least one additional event category which may be caused by said trigger event category;

(f) obtaining a count of the number of occurrences of said successive causality rule candidate;

(g) comparing said count of the number of occurrences of said successive causality rule candidate to a pre-set threshold; and (h) repeating steps (e) through (g) if said count exceeds said pre-set threshold.

2. The method of claim 1 additionally comprising the step of (a) comparing said number of occurrences of said first causality rule candidate to a first rule threshold; and (b) deriving a second consequential set if said number of occurrences of said first causality rule candidate does not exceed said first rule threshold.

3. The method of claim 1 further comprising the step of applying at least one pre-defined constraint to said at least one event category and said at least one additional event category from said preprocessed event database which may be caused by said trigger event category.

4. The method of claim 1 wherein said event database includes at least one composite event and wherein said determining of said first consequential set is preceded by the steps of:

(a) breaking each of said at least one composite events into its basic event categories; and (b) re-ordering said event category sequence including said basic event categories from said at least one composite event to provide a re-ordered event category sequence.

5. The method of claim 4 wherein said obtaining a count of the number of occurrences of said successive causality rule candidate comprises comparing said successive causality rule candidate to said re-ordered event category sequence.

6. The method of claim 5 further comprising the final step of comparing said determined at least one causality rule to said preprocessed event database.

7. The method of claim 6 wherein said comparing comprises applying a bipartite graph matching algorithm.

8. The method of claim 1 additionally comprising the steps of:

(a) generating a succeeding causality rule candidate comprising said successive causality rule candidate and at least one additional trigger event category;

(b) obtaining a count of the number of occurrences of said succeeding causality rule candidate;

(c) comparing said count of the number of occurrences of said succeeding causality rule candidate to said pre-set threshold; and (d) repeating steps (a) through (c) if said count exceeds said pre-set threshold.

9. A method for a computer to derive category information from a database of event data, wherein an event selected from said event data may belong to one or more of a plurality of categories, comprising the steps of:

(a) preprocessing said event data into an event category database by sorting said event data according to event criteria and mapping said sorted event data into said event categories; and (b) determining at least one causality rule from said preprocessed event data.

10. The method of claim 9 additionally comprising the step of forming a plurality of event category sequences, whereby at least one event category sequence is formed for each event category.

11. The method of claim 9 wherein said event criteria comprises user information.

* * * * *